United States Patent
Wang et al.

(10) Patent No.: US 11,159,239 B2
(45) Date of Patent: Oct. 26, 2021

(54) SINGLE-FIBER BIDIRECTIONAL OPTICAL TRANSCEIVER SUBASSEMBLY

(71) Applicant: HANGZHOU XIN YUN TECHNOLOGY CO., LTD., Zhejiang (CN)

(72) Inventors: Zongwang Wang, Zhejiang (CN); Xiaoliang Xia, Zhejiang (CN); Zhenzhen Wang, Zhejiang (CN); Bin Tian, Zhejiang (CN)

(73) Assignee: HANGZHOU XIN YUN TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 17/042,220

(22) PCT Filed: Jan. 20, 2020

(86) PCT No.: PCT/CN2020/073136
§ 371 (c)(1),
(2) Date: Sep. 28, 2020

(87) PCT Pub. No.: WO2020/186926
PCT Pub. Date: Sep. 24, 2020

(65) Prior Publication Data
US 2021/0119702 A1     Apr. 22, 2021

(30) Foreign Application Priority Data
Mar. 15, 2019     (CN) .......................... 201910199981.X

(51) Int. Cl.
*H04B 10/2581*     (2013.01)
*G02B 6/293*     (2006.01)
(Continued)

(52) U.S. Cl.
CPC ......... *H04B 10/2581* (2013.01); *G02B 6/293* (2013.01); *G02B 6/4206* (2013.01);
(Continued)

(58) Field of Classification Search
CPC .... G02B 6/293; G02B 6/4207; G02B 6/4206; H04B 10/40; H04B 10/2581
(Continued)

(56) References Cited

U.S. PATENT DOCUMENTS 4,912,523 A * 3/1990 Refi .................. H04B 10/2581
398/42
4,973,169 A * 11/1990 Slonecker .............. G02B 6/274
385/1
(Continued)

FOREIGN PATENT DOCUMENTS

CN     202512275 U     10/2012
CN     203535266 U     4/2014
(Continued)

OTHER PUBLICATIONS

International Search Report for PCT/CN2020/073136 dated Apr. 1, 2020, ISA/CN.

*Primary Examiner* — Abbas H Alagheband
(74) *Attorney, Agent, or Firm* — Yue (Robert) Xu; Apex Attorneys at Law, LLP

(57) ABSTRACT

A single-fiber bidirectional optical transceiver subassembly, related to technology of optical communications, including an optical transmitting subassembly, an optical receiving subassembly and an optical splitting and filtering unit. The optical transmitting subassembly is coupled with an optical input port of the optical splitting and filtering unit. The optical receiving subassembly is coupled with an optical output port of the optical splitting and filtering unit. A bidirectional port of the optical splitting and filtering unit is
(Continued)

coupled with a single-mode fiber. Each optical element in the optical transmitting subassembly, the optical receiving subassembly, and the optical splitting and filtering unit is a spatial optical element. Single-fiber bidirectional transmission is implemented with small channel spacing, by improving the optical splitting and filtering unit.

4 Claims, 5 Drawing Sheets

(51) Int. Cl.
    *G02B 6/42*         (2006.01)
    *H04B 10/40*     (2013.01)
    *H04J 14/04*      (2006.01)
    *H04J 14/02*      (2006.01)

(52) U.S. Cl.
    CPC ........... *G02B 6/4207* (2013.01); *H04B 10/40* (2013.01); *H04J 14/02* (2013.01); *H04J 14/04* (2013.01)

(58) Field of Classification Search
    USPC .......................................................... 398/44
    See application file for complete search history.

(56) References Cited

U.S. PATENT DOCUMENTS

| | | | |
|---|---|---|---|
| 7,509,048 B2* | 3/2009 | Turpin | G02B 6/2861 398/83 |
| 7,952,716 B2* | 5/2011 | Dosmann | G01N 21/8483 356/446 |
| 2003/0194165 A1* | 10/2003 | Silberberg | G02B 6/29383 385/11 |
| 2007/0116468 A1* | 5/2007 | Ji | H04J 14/02 398/79 |
| 2008/0137363 A1* | 6/2008 | Harris | A61B 5/0068 362/574 |
| 2012/0140302 A1* | 6/2012 | Xie | A61B 5/0084 359/200.8 |
| 2014/0161390 A1* | 6/2014 | Winzer | H04J 14/04 385/28 |
| 2014/0205293 A1* | 7/2014 | Lin | H01S 5/141 398/58 |
| 2015/0043910 A1* | 2/2015 | Koebele | H04B 10/2581 398/44 |
| 2015/0295658 A1* | 10/2015 | Chen | G02B 6/2746 398/65 |
| 2017/0279554 A1* | 9/2017 | Lin | H04B 10/50 |
| 2018/0284241 A1* | 10/2018 | Campbell | G01S 7/4865 |
| 2018/0284350 A1* | 10/2018 | Ayliffe | G02B 6/4213 |
| 2019/0158182 A1* | 5/2019 | Jia | H04J 14/02 |
| 2020/0007230 A1* | 1/2020 | Wang | H04B 10/1123 |
| 2020/0044738 A1* | 2/2020 | Leigh | H04J 14/02 |
| 2020/0119828 A1* | 4/2020 | Sahni | H04J 14/02 |
| 2020/0249541 A1* | 8/2020 | Tzang | G01N 29/46 |

FOREIGN PATENT DOCUMENTS

| | | |
|---|---|---|
| CN | 104635306 A | 5/2015 |
| CN | 108732684 A | 11/2018 |
| CN | 108833016 A | 11/2018 |
| CN | 108873199 A | 11/2018 |
| CN | 109782394 A | 5/2019 |

\* cited by examiner

SINGLE-FIBER BIDIRECTIONAL OPTICAL TRANSCEIVER SUBASSEMBLY

This application is the national phase of International Application No. PCT/CN2020/073136, titled "SINGLE-FIBER BIDIRECTIONAL OPTICAL TRANSCEIVING ASSEMBLY", filed on Jan. 20, 2020, which claims priority to Chinese Patent Application No. 20910199981.X, titled "SINGLE-FIBER BIDIRECTIONAL OPTICAL TRANSCEIVER SUBASSEMBLY", filed on Mar. 15, 2019 with the China National Intellectual Property Administration, which is incorporated herein by reference in its entirety.

FIELD

The present disclosure relates to the technical field of optical communications, and in particular, to a single-fiber bidirectional optical transceiver subassembly.

BACKGROUND

A single-fiber bidirectional optical subassembly (BOSA) is a photoelectric conversion device that integrates transmission and reception, and is a key device in current communications. The single-fiber BOSA is capable to couple light beams from an optical transmitter and an optical receiver to an optical fiber, so as to achieve single-fiber bidirectional transmission of uplink optical signals and downlink optical signals. Generally, a typical single-fiber BOSA applies a wavelength combination of 1310 nm and 1550 nm or a wavelength combination of 1490 nm and 1550 nm, and applies a wavelength division multiplexing (WDM) technology for light splitting. In a case that optical frequency spacing between an uplink signal and a downlink signal is much smaller than an optical frequency spacing between the two wavelengths in the above-mentioned combinations, an optical splitting effect of a WDM filter is insufficient for maintaining stable communications. As a result, bidirectional communications with small channel spacing cannot be implemented in the single-fiber bidirectional transmission.

A patent document published on Oct. 24, 2017 with publication No. CN107294606A discloses a bidirectional optical transceiver for a single-mode fiber, including a light transmitting module, a light receiving module, a spot conversion structure, and a wavelength division multiplexing module fabricated through silicon nitride technology. The light transmitting module is coupled to an uplink optical-signal transmitting terminal of the wavelength division multiplexing module. A downlink optical-signal receiving terminal of the wavelength division multiplexing module and the light receiving module are coupled to each other via the spot conversion structure. An optical fiber connection terminal of the wavelength division multiplexing module is coupled to an optical-line terminal via an optical fiber. The light receiving module, the wavelength division multiplexing module, and the mode spot conversion structure are integrated on a same silicon substrate through silicon photonics technology, and the light transmitting module is compounded and integrated on the silicon substrate. Effective coupling between the wavelength division multiplexing module and the light receiving module, and effective coupling between the light transmitting module and the optical fiber, are realized. A dimension of a waveguide is uniform. Thus, signal loss may be effectively decreased, false reflection may be reduced, and the communications may be insensitive to ambient temperature. Nevertheless, the technical problem of wide channel spacing in single-fiber bidirectional transmission is not addressed.

A patent document published on Jun. 27, 2014 with publication No. CN203930136U discloses a single-fiber bidirectional optical transceiver subassembly, including an input and output terminal, an optical assembly, a receiving terminal and a transmitting terminal. The optical assembly includes, according to a light path, a polarization beam-splitting element, an optical rotator unit, a polarization beam-splitting prism, and an optical coupling unit. The optical rotator unit further includes a magnetic optical rotator and a half wave plate, which are located at a transmitting-terminal side of the light path. Thus, coupling efficiency may be high, interference of adjacent wavelengths may be avoided, addressed is a problem that optical transceiver signals may not be effectively separated, and a single-fiber bidirectional optical transceiver subassembly may be implemented with an arbitrary wavelength interval. Nevertheless, the light source at the transmitting terminal is limited to be a directional linearly-polarized light source, and the polarization beam splitting prism 72 is merely utilized as a beam splitter. The polarization beam splitting prism 72 are not fully utilized as both a beam splitter and a beam combiner, therefore hindering further reduction in a size of the optical subassembly and hindering implementation of a more compact internal structure of the single-fiber bidirectional optical transceiver assembly.

SUMMARY

The present disclosure aims to address a technical problem that communications with small channel spacing cannot be effectively achieved in current single-fiber bidirectional transmission. A single-fiber bidirectional optical subassembly is provided, which applies an improved splitting and filtering unit. Technical solutions of the present disclosure can realize single-fiber bidirectional transmission of an uplink optical signal and a downlink optical signal with small channel spacing, and a requirement on miniaturization of a device is further considered.

In order to address the above technical problem, technical solutions of the present disclosure are provided as follows. A single-fiber bidirectional optical transceiver subassembly, applied to bidirectional communications of a single-mode fiber 4, is provided, including: an optical transmitting subassembly 1, an optical receiving subassembly 2, and an optical splitting and filtering unit 3. The optical transmitting subassembly 1 is coupled with an optical input port a of the optical splitting and filtering unit 3. The optical receiving subassembly 2 is coupled with an optical output port b of the optical splitting and filtering unit 3. A bidirectional port c of the optical splitting and filtering unit 3 is coupled with the single-mode fiber 4. Each optical element in the optical transmitting subassembly 1, the optical receiving subassembly 2, and the optical splitting and filtering unit 3 is a spatial optical element.

In a preferable embodiment, the optical splitting and filtering unit 3 includes a splitter 301 and a filter 302. The optical transmitting subassembly 1 is coupled with the optical input port a of the splitter 301, and the bidirectional port c of the splitter 301 is coupled with the single-mode fiber 4. An optical output port d of the splitter 301 is coupled with an input port of the filter 302. The optical receiving subassembly 2 is coupled with the output port b of the filter 302. Both the splitter 301 and the filter 302 are both spatial optical elements.

In a preferable embodiment, the splitter 301 includes a first polarization splitting prism 301a, a Faraday rotator 301b, a wave plate 301c, and a second polarization splitting prism 301d. The first polarization splitting prism 301a includes a first prism 3011 and a second prism 3012 that are adhered to each other, and the second polarization splitting prism 301d includes a third prism 3013 and a fourth prism 3014 that are adhered to each other. A cross section of each of the first prism 3011, the second prism 3012, and the fourth prism 3014 is a parallelogram with an angle of 45 degrees, and a cross section of the third prism 3013 is an isosceles triangle. A lower surface of the first prism 3011 is adhered to an upper surface of the second prism 3012, and a hypotenuse surface of the third prism 3013 is adhered to an upper surface of the fourth prism 3014. An adhesion surface between the first prism 3011 and the second prism 3012, and an adhesion surface between the third prism 3013 and the fourth prism 3014, are both plated with a dielectric beam splitting film 301e. Lateral surfaces of the first prism 3011, lateral surfaces of the second prism 3012, lateral surfaces of the fourth prism 3014, and a first surface of the third prism 3013 are parallel with each other. Each of an upper surface of the first prism 3011, a lower surface of the second prism 3012, and a lower surface of the fourth prism 3014 serves as a reflective surface. A left lateral surface of the first prism 3011 is coupled with the optical transmitting subassembly 1, and a left lateral surface of the second prism 3012 is coupled with the input port of the filter 302. A right lateral surface of the first prism 3011 is connected to the first surface of the third prism 3013 sequentially via a Faraday rotator 301b and a wave plate 301c. A right lateral surface of the second prism 3012 is connected to a left lateral surface of the fourth prism 3014 sequentially via a Faraday rotator 301b and a wave plate 301c. A right lateral surface of the fourth prism 3014 is coupled with the single-mode fiber 4.

In a preferable embodiment, the Faraday rotator 301b is a 45-degree Faraday rotator, and the wave plate 301c is a half wave plate.

In a preferable embodiment, the optical splitting and filtering unit 3 includes: a comb filter 303, a circulator 304 and a filter 302. The optical transmitting subassembly 1 is coupled with an input port of the comb filter 303. An input port of the circulator 304 is coupled with an output port of the comb filter 303. A bidirectional port of the circulator 304 is coupled with a single-mode fiber 4. An output port of the circulator 304 is coupled with an input port of the filter 302. The optical receiving subassembly 2 is coupled with an output port of the filter 302.

In a preferable embodiment, the comb filter 303 has an MGTI (Michelson Gires-Tournois Interferometer) structure.

A technical effect of the present disclosure is as follows. Single-fiber bidirectional transmission with low channel spacing is achieved by improving the optical splitting and filtering unit.

| Reference signs: | |
|---|---|
| 1: Optical transmitting subassembly; | 2: Optical receiving subassembly; |
| 3: Splitting and filtering unit; | 4: Single-mode fiber; |
| 301: Splitter; | 301a: First polarization splitting prism; |
| 301b: Faraday rotator; | 301c: Wave plate; |
| 301d: Second polarization splitting prism; | |
| 301e: Dielectric beam splitting film; | |
| 3011: First prism; | 3012: Second prism; |
| 3013: Third prism; | 3014: Fourth prism; |
| 302: Filter; | 303: Comb filter; |
| 304: Circulator. | |

DETAILED DESCRIPTION

Hereinafter embodiments of the present disclosure will be further described in detail in conjunction with the drawings.

First Embodiment

Figure 1:
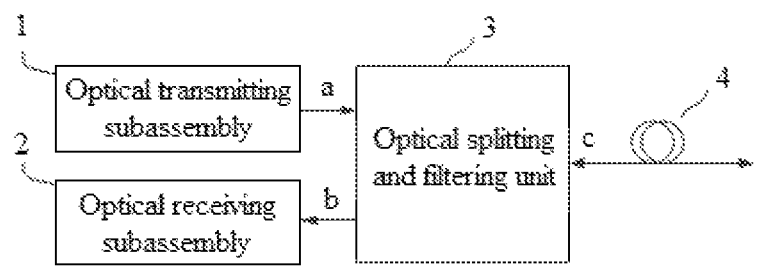
FIG. 1 is a schematic structural diagram of a single-fiber bidirectional optical transceiver subassembly according to an embodiment of the present disclosure.

A single-fiber bidirectional optical transceiver subassembly, applied to bidirectional communications of a single-mode fiber 4, is provided. Reference is made to FIG. 1. The single-fiber bidirectional optical transceiver subassembly includes an optical transmitting subassembly 1, an optical receiving subassembly 2, and an optical splitting and filtering unit 3. The optical transmitting subassembly 1 is coupled with an optical input port a of the optical splitting and filtering unit 3. The optical receiving subassembly 2 is coupled with an optical output port b of the optical splitting and filtering unit 3. A bidirectional port c of the optical splitting and filtering unit 3 is coupled with the single-mode fiber 4. Each optical element in the optical transmitting subassembly 1, the optical receiving subassembly 2, and the optical splitting and filtering unit 3 is a spatial optical element.

Figure 2:
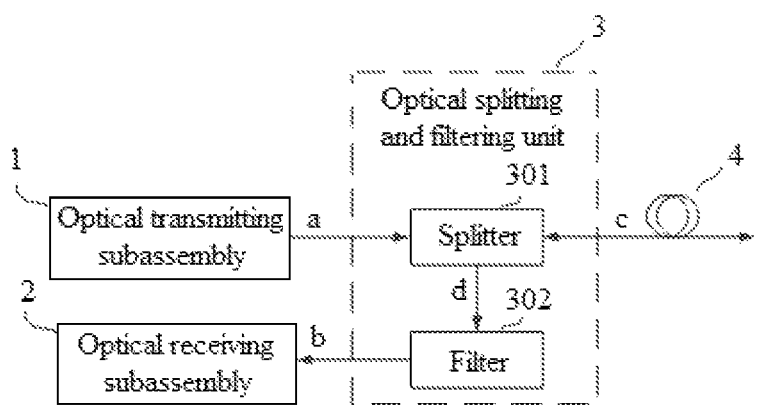
FIG. 2 is a schematic structural diagram of an optical splitting and filtering unit according to an embodiment of the present disclosure.

Reference is made to FIG. 2, the optical splitting and filtering unit 3 includes a splitter 301 and a filter 302. The optical transmitting subassembly 1 includes three ports, that is, the optical input port a, an optical output port d, and the bidirectional port c. The optical transmitting subassembly 1 is coupled with the optical input port a of the splitter 301, and the bidirectional port c of the splitter 301 is coupled with the single-mode fiber 4. The optical output port d of the splitter 301 is coupled with an input port of the filter 302.

The optical receiving subassembly 2 is coupled with the output port b of the filter 302. Both the splitter 301 and the filter 302 are spatial optical elements. All light paths among the splitter 301, the filter 302, the optical transmitting subassembly 1, the optical receiving subassembly 2, and the optical splitting and filtering unit 3 are spatial light paths.

An uplink optical signal generated from the optical transmitting subassembly 1 enters the splitter 301 through the port a, exits from the splitter 301 through the port c, and enters a transmission link of the single-mode fiber 4. A downlink optical signal in the transmission link of the single-mode fiber 4 enters the splitter 301 through the port c, exits from the splitter 301 through the port d, and enters the filter 302. In the filter 302, the downlink optical signal is transmitted while retro-reflected light due to the uplink optical signal is filtered out. Thereby, a pure downlink optical signal is outputted from the filter 302 through the port b, and enters the optical receiving subassembly 2.

Figure 3:
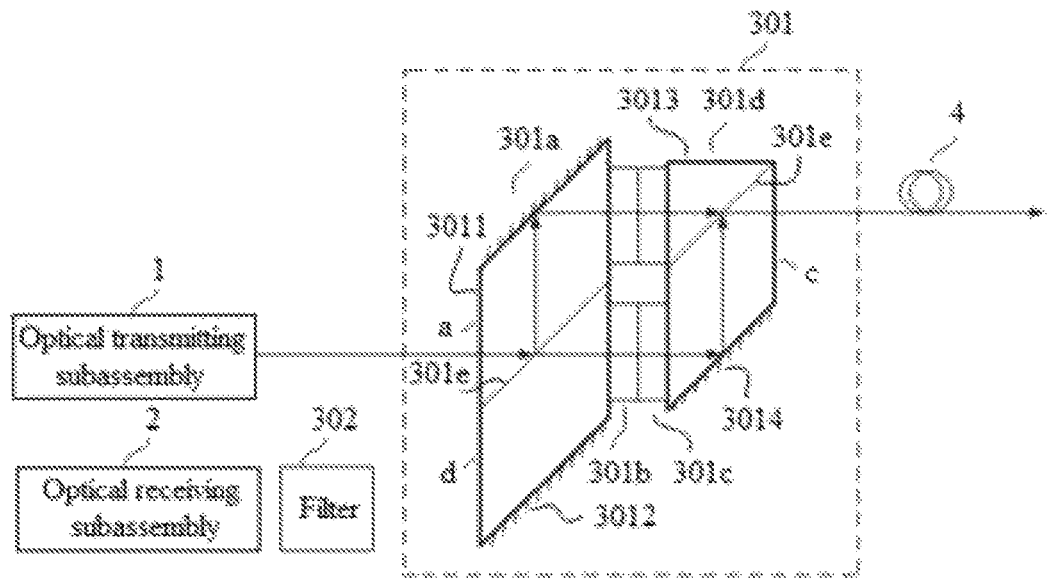
FIG. 3 is a schematic diagram of a structure of a splitter and an uplink light path according to an embodiment of the present disclosure.
Figure 4:
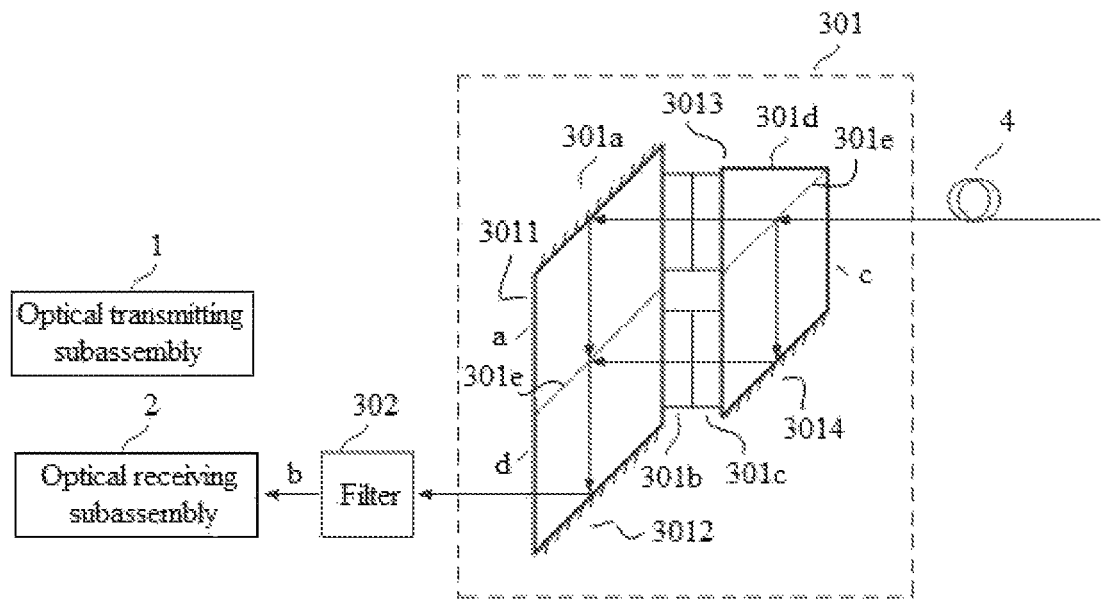
FIG. 4 is a schematic diagram of a structure of a splitter and a downlink light path according to an embodiment of the present disclosure.
Figure 5:
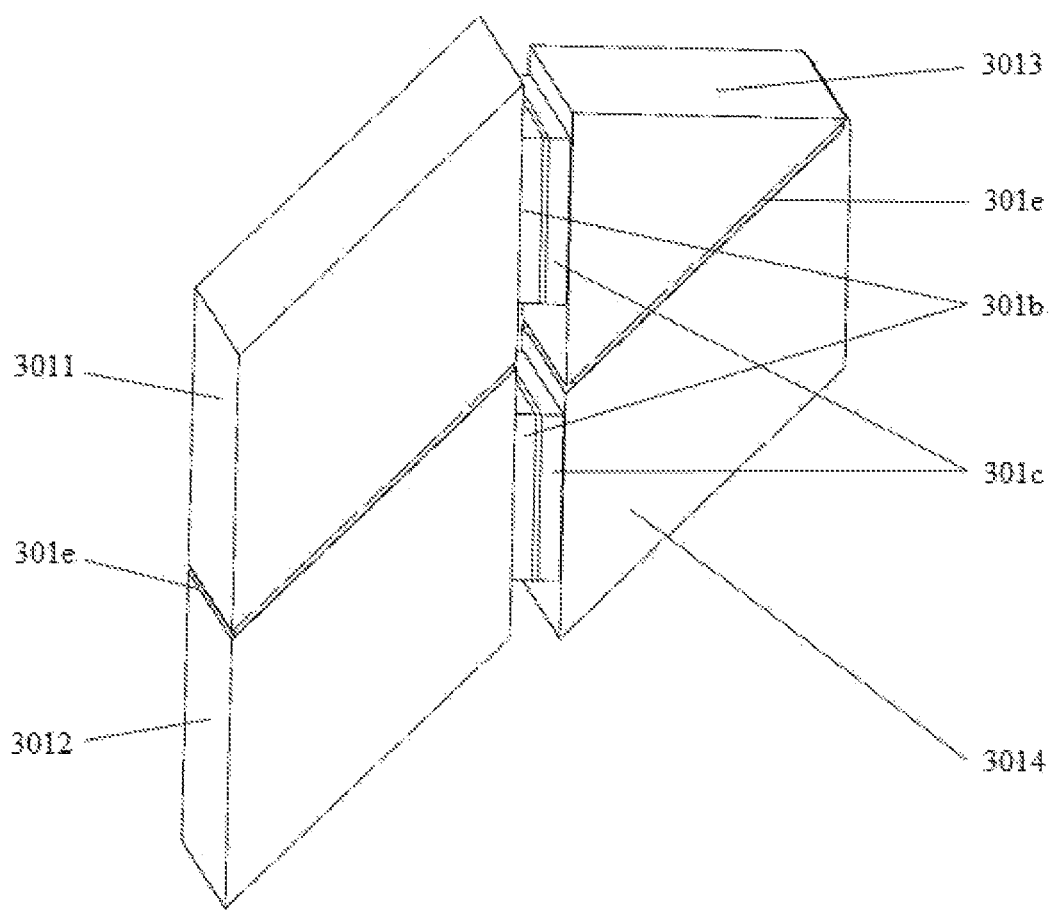
FIG. 5 is a schematic diagram of a three-dimensional structure of a splitter according to an embodiment of the present disclosure.

Reference is made to FIGS. 3 to 5. The splitter 301 includes a first polarization splitting prism 301a, a Faraday rotator 301b, a wave plate 301c, and a second polarization splitting prism 301d. The first polarization splitting prism 301a includes a first prism 3011 and a second prism 3012 that are adhered to each other, and the second polarization splitting prism 301d includes a third prism 3013 and a fourth prism 3014 that are adhered to each other. A cross section of each of the first prism 3011, the second prism 3012, and the fourth prism 3014 is a parallelogram with an angle of 45 degrees, and a cross section of the third prism 3013 is an isosceles triangle. A lower surface of the first prism 3011 is adhered to an upper surface of the second prism 3012, and a hypotenuse surface of the third prism 3013 is adhered to an upper surface of the fourth prism 3014. An adhesion surface between the first prism 3011 and the second prism 3012, and an adhesion surface between the third prism 3013 and the fourth prism 3014, are both plated with a dielectric beam splitting film 301e. Lateral surfaces of the first prism 3011, lateral surfaces of the second prism 3012, lateral surfaces of the fourth prism 3014, and a first surface of the third prism 3013 are parallel with each other. Each of an upper surface of the first prism 3011, a lower surface of the second prism 3012, and a lower surface of the fourth prism 3014 serves as a reflective surface. A left lateral surface of the first prism 3011 is coupled with the optical transmitting subassembly 1, and a left lateral surface of the second prism 3012 is coupled with the input port of the filter 302. A right lateral surface of the first prism 3011 is connected to the first surface of the third prism 3013 sequentially via the Faraday rotator 301b and the wave plate 301c. A right lateral surface of the second prism 3012 is connected to a left lateral surface of the fourth prism 3014 sequentially via a Faraday rotator 301b and a wave plate 301c. A right lateral surface of the fourth prism 3014 is coupled with the single-mode fiber 4. The Faraday rotator 301b is a 45-degree Faraday rotator, and the wave plate 301c is a half wave plate.

Reference is further made to FIGS. 3 and 4. The splitter 301 includes the first polarization splitting prism 301a, the Faraday rotator 301b, the wave plate 301c, and the second polarization splitting prism 301d. Each of the first polarization splitting prism 301a and the second polarization splitting prism 301d is two prisms adhered together. The dielectric beam splitting film 301e is plated between the two prisms. The dielectric beam splitting film 301e is configured to separate an s-polarized component from a p-polarized component in an incident light, or combine an s-polarized light beam and a p-polarized light beam. In FIGS. 3 and 4, the lateral surfaces a and d of the first polarization splitting prism 301a correspond to the ports a and d, respectively, of the splitter 301. An upper surface and a lower surface of the first polarization splitting prism 301a are both reflective surfaces. The lateral surface c of the second polarization splitting prism 301d corresponds to a port c of the splitter 301. The lower surface of the second polarization splitting prism 301d is a reflective surface. A combination of the Faraday rotator 301b and the wave plate 301c is capable to rotate a polarization orientation of a passing light beam by 90 degrees, while not changing a polarization orientation of a reversely transmitted light beam. A preferable embodiment of the combination includes a 45-degree Faraday rotator and a half wave plate.

The light path shown in FIG. 3 is an uplink light path outputted from the optical transmitting subassembly 1 to a transmission link of the single-mode fiber 4. An uplink optical signal outputted by the optical transmitting subassembly 1 enters the first polarization splitting prism 301a through the port a. The s-polarized component and the p-polarized component of the uplink optical signal are separated at an interface of the two prisms in the first polarization splitting prism 301a, and thereby form two light beams with perpendicular polarization orientations. The two light beams pass the Faraday rotator 301b and the wave plate 301c, and thereby both polarization orientations are changed. The two light beams with the changed polarization orientations enter the second polarization splitting prism 301d, converge at an interface of the two prisms in the second polarization splitting prism 301d, and thereby form a light beam. Such light beam is outputted from the port c, and enters the transmission link of the single-mode fiber 4.

The light path shown in FIG. 4 is a downlink light path outputted from the transmission link of the single-mode fiber 4 to the optical receiving subassembly 2. A downlink optical signal outputted by the transmission link of the single-mode fiber 4 enters the second polarization splitting prism 301d through the port c. The s-polarized component and the p-polarized component of the downlink optical signal are separated at an interface between the two prisms of the second polarization splitting prism 301d, and thereby form two light beams with perpendicular polarization orientations. The two light beams pass the combination of the wave plate 301c and the Faraday rotator 301b without changing the polarization orientations. The two light beams enter the first polarization splitting prism 301a, converge at an interface between the two prisms of the first polarization splitting prism 301a, and thereby form a light beam. Such light beam is outputted from the first polarization splitting prism 301a through the port d, and then enters the filter 302. In such case, the retro-reflected light from the uplink light as shown in FIG. 3 enters the filter 302 via the light path as shown in FIG. 4. The filter 302 filters out the retro-reflected light with a pass-band thereof, and outputs a pure downlink optical signal. The downlink optical signal outputted from the filter 302 enters the optical receiving subassembly 2 through the port b.

Second Embodiment

Figure 6:
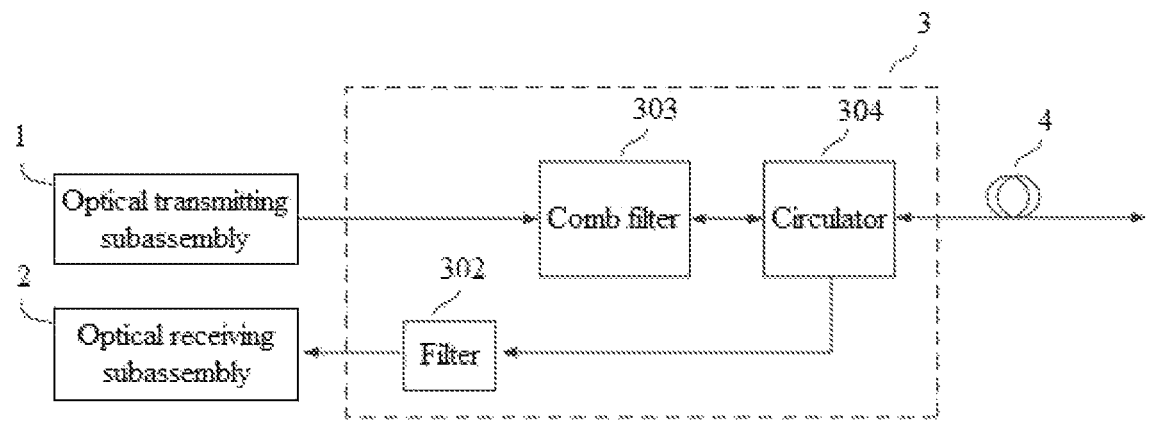
FIG. 6 is a structural schematic diagram of a single-fiber bidirectional optical transceiver subassembly according to another embodiment of the present disclosure.

Reference is made to FIG. 6, which is another single-fiber bidirectional optical transceiver subassembly. The single-fiber bidirectional optical transceiver subassembly includes an optical transmitting subassembly 1, an optical receiving subassembly 2, and an optical splitting and filtering unit 3. The optical splitting and filtering unit 3 includes: a comb filter 303, a circulator 304 and a filter 302. The optical transmitting subassembly 1 is coupled with an input port of the comb filter 303. An input port of the circulator 304 is coupled with an output port of the comb filter 303. A bidirectional port of the circulator 304 is coupled with a single-mode fiber 4. An output port of the circulator 304 is coupled with an input port of the filter 302. The optical receiving subassembly 2 is coupled with an output port of the filter 302. An uplink optical signal outputted from the optical transmitting subassembly 1 passes the comb filter 303 and the circulator 304 sequentially, and then enters into a transmission link of the single-mode fiber 4. A downlink optical signal inputted from the transmission link of the single-mode fiber 4 enters the comb filter 303 through the circulator 304, returns to the circulator 304 after being outputted from the comb filter 303, then is transmitted to the filter 302 from the circulator 304, and finally enters the optical receiving subassembly 2.

Figure 7:
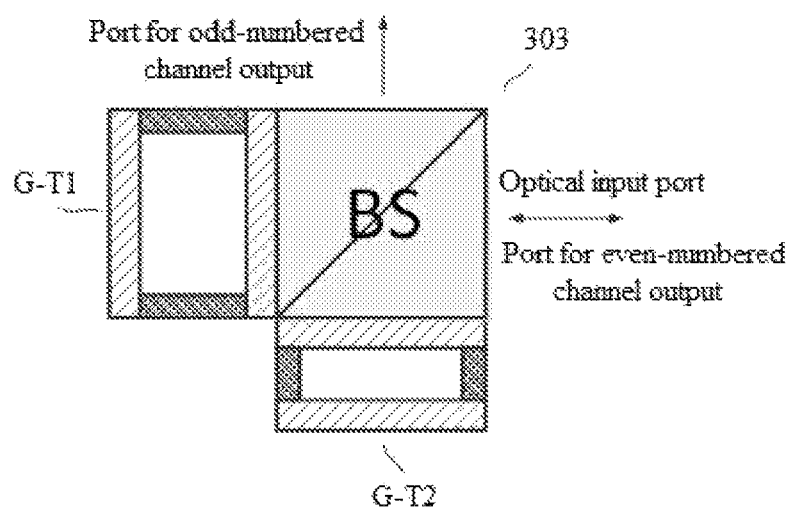
FIG. 7 is a structural schematic diagram of a comb filter with an MGTI Michelson Gires-Tournois Interferometer) structure according to an embodiment of the present disclosure.

The comb filter 303 (an interleaver) is an optical device capable to generate an odd-numbered channel output and an even-numbered channel output, through the interference of two or more light beams. A comb filter with a fixed structure outputs an optical signal from an odd-numbered channel or an even-numbered channel, only when a frequency of an incident light meets a certain condition. In this embodiment, the comb filter is preferably of a multi-beam interference type, such that the output signal of the comb filter 303 approximates a square wave. For example, the comb filter is of an MGTI (Michelson Gires-Tournois Interferometer) type, including a Michelson interferometer and an etalon, as shown in FIG. 7. The MGTI optical comb filter 303 has two optical ports in total, that is, an optical input port and a port for an odd-numbered channel output. The optical input port also serves as a port for an even-numbered channel output. In this embodiment, structural parameters including lengths of two sides G-T1 and G-T2 of Gires-Tournois (G-T) cavities, a mirror reflectivity, and the like, of the comb filter 303 are reasonably designed. One of the odd-numbered channel and the even-numbered channel of the comb filter 303 serves as an uplink light path, and the other serves as a downlink light path. Thereby, single-fiber transmission of uplink and downlink optical signals is implemented with small frequency spacing.

Figure 8:
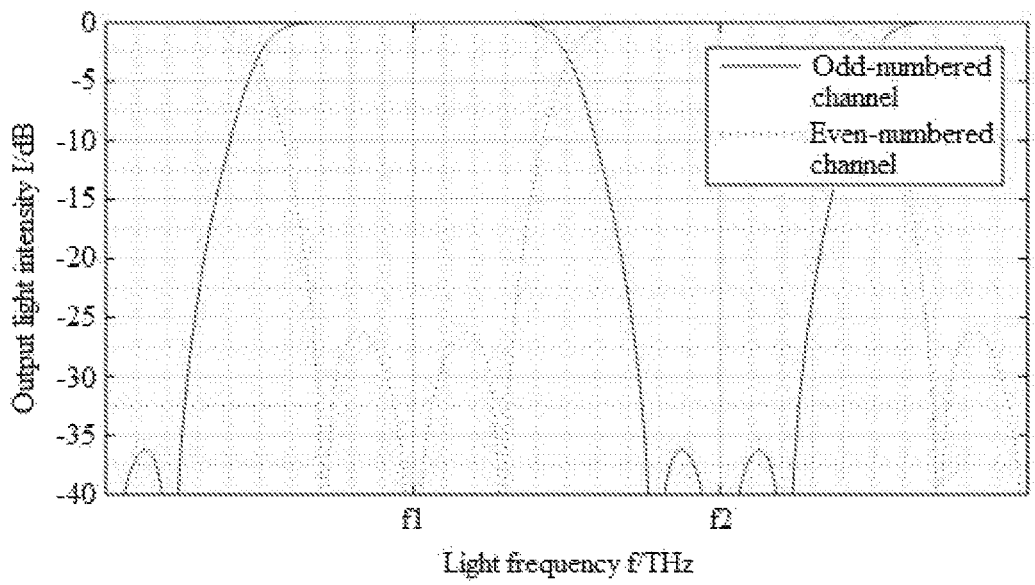
FIG. 8 is a filtering curve of an optical comb filter according to an embodiment of the present disclosure.
Figure 9:
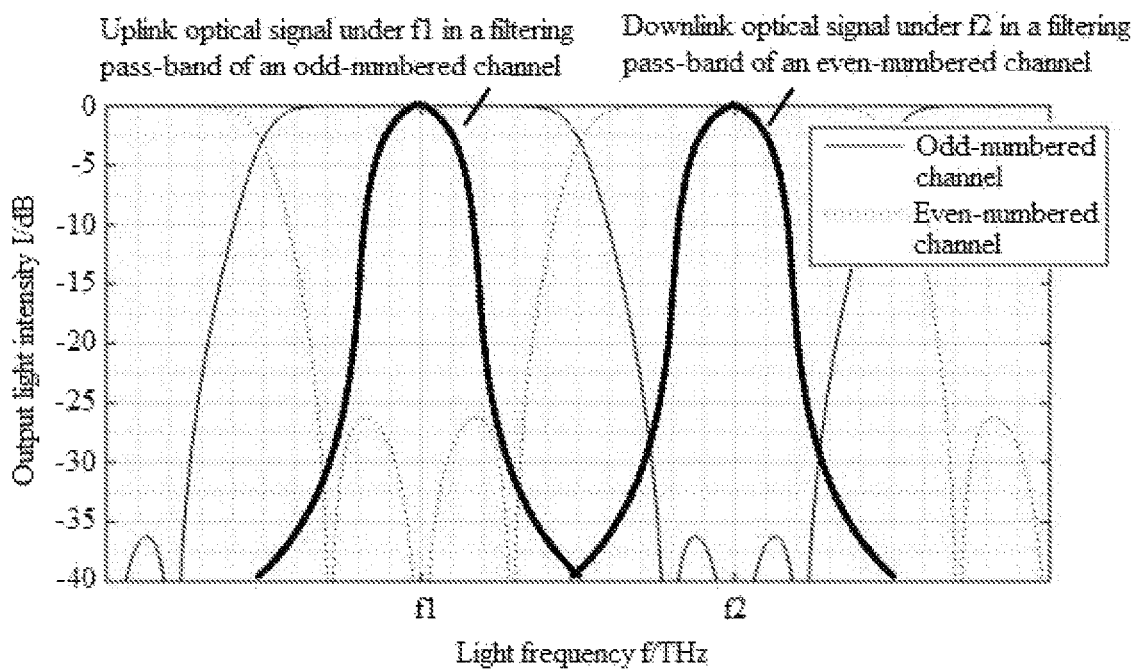
FIG. 9 is a schematic diagram of a filtering effect of an optical comb filter according to an embodiment of the present disclosure.

FIG. 8 is a filtering curve of the comb filter 303 in an embodiment. Frequency spacing between the odd-numbered channel and the even-numbered channel is 50 GHz, and a center frequency of a pass-band corresponds to that recommended by ITU-T (Telecommunication Standardization Sector of International Telecommunication Union). Reference is made to FIG. 9. A center frequency of the uplink optical signal is f1, and a center frequency of the downlink optical signal is f2. In the filtering curve of the comb filter 303, f1 and f2 correspond to filtering centers of an odd-numbered channel and an even-numbered channel, respectively, which are adjacent. The uplink optical signal under f1 is outputted from the optical transmitting subassembly 1 to the optical input port of the comb filter 303, and forms an interference signal in the comb filter 303 through processes such as light splitting and multi-beam interference. Afterwards, such interference signal is outputted from the port for the odd-numbered channel output of the comb filter 303, and then enters the transmission link of the single-mode fiber 4 via the circulator 304. The downlink optical signal under f2 in the transmission link of the single-mode fiber 4 enters the optical input port of the comb filter 303 via the circulator 304, and forms an interference signal in the comb filter 303 through processes such as light splitting process multi-beam interference. Afterwards, such interference signal is outputted from the port for the even-numbered channel output of the comb filter 303, then enters the filter 302 via the circulator 304, and enters the optical receiving subassembly 2 after exiting from the filter 302.

The above-mentioned embodiments are merely preferable solutions of the present disclosure, and should not be construed as any form of limitations on the present disclosure. There may be other variations and modifications without exceeding technical solutions covered by the claims.

The invention claimed is:

1. A single-fiber bidirectional optical transceiver subassembly, applied to bidirectional communications of a single-mode fiber, comprising:
   an optical emitter,
   an optical receiver, and
   an optical splitting and filtering unit;
   wherein the optical emitter is coupled with an optical input port of the optical splitting and filtering unit, the optical receiver is coupled with an optical output port of the optical splitting and filtering unit, and a bidirectional port of the optical splitting and filtering unit is coupled with the single-mode fiber; and
   wherein the optical emitter, the optical receiver, and the optical splitting and filtering unit is a spatial optical element;
   wherein: the optical splitting and filtering unit comprises a splitter and a filter;
   the optical emitter is coupled with a first optical input port of the splitter, the first optical input port of the splitter serves as the optical input port of the optical splitting and filtering unit, and the bidirectional port of the splitter is coupled with the single-mode fiber;
   a second optical output port of the splitter is coupled with an input port of the filter;
   the optical receiver is coupled with an output port of the filter; and
   both the splitter and the filter is a spatial optical element respectively;
   the optical splitting and filtering unit comprises a comb filter, a circulator, and the filter;
   the optical emitter is coupled with an input port of the comb filter;
   an input port of the circulator is coupled with an output port of the comb filter, a bidirectional port of the circulator is coupled with the single-mode fiber, and an output port of the circulator is coupled with an input port of the filter; and
   the optical receiver is coupled with an output port of the filter.

2. The single-fiber bidirectional optical transceiver subassembly according to claim 1, wherein:
   the splitter comprises a first polarization splitting prism, a Faraday rotator, a wave plate, and a second polarization splitting prism;
   the first polarization splitting prism comprises a first prism and a second prism that are adhered to each other, and the second polarization splitting prism comprises a third prism and a fourth prism that are adhered to each other;
   a cross section of each of the first prism, the second prism, and the fourth prism is a parallelogram with an angle of 45 degrees, and a cross section of the third prism is an isosceles triangle;
   a first surface of the first prism is adhered to a first surface of the second prism, and a hypotenuse surface of the third prism is adhered to a first surface of the fourth prism;

an adhesion surface between the first prism and the second prism, and an adhesion surface between the third prism and the fourth prism, are both plated with a dielectric beam splitting film;

a second surface and a third lateral surface of the first prism, a second lateral surface and a third lateral surface of the second prism, a second lateral surface and a third lateral surface of the fourth prism, and a first surface of the third prism are parallel with each other, wherein the second surface is opposite to the third surface for each of the first prism, the second prism, and the fourth prism;

each of a fourth surface of the first prism, a fourth surface of the second prism, and a fourth surface of the fourth prism serves as a reflective surface, wherein the fourth surface is opposite to the first surface for each of the first prism, the second prism, and the fourth prism;

the second surface of the first prism is coupled with the optical emitter, and the second surface of the second prism is coupled with the input port of the filter;

the third surface of the first prism is connected to the first surface of the third prism sequentially via a portion of the Faraday rotator and a portion of the wave plate;

the third surface of the second prism is connected to the second surface of the fourth prism sequentially via another portion of the Faraday rotator and another portion of the wave plate; and the third surface of the fourth prism is coupled with the single-mode fiber.

3. The single-fiber bidirectional optical transceiver sub-assembly according to claim 2, wherein the Faraday rotator is a 45-degree Faraday rotator, and the wave plate is a half wave plate.

4. The single-fiber bidirectional optical transceiver sub-assembly according to claim 1, wherein the comb filter has an MGTI (Michelson Gires-Tournois Interferometer) structure.

* * * * *